Patented Mar. 14, 1944

2,344,019

UNITED STATES PATENT OFFICE 2,344,019

COMPOSITION AND METHOD FOR PRESERVING WOOD

Enoch Bostrum, Buffalo, N. Y., assignor to Osmose Wood Preserving Company of America, Inc., Buffalo, N. Y., a corporation of New York No Drawing. Application March 3, 1941, Serial No. 381,551

8 Claims. (Cl. 167—38.7)

The present invention relates to the preservation of wood and particularly to a process and a composition for the preservation of wood. This application is a continuation-in-part of my co-pending United States application Serial Number 181,106, filed December 22, 1937.

It is known to coat moist wood with an aqueous paste comprising a water-soluble wood preservative thickened with a water-swelling gum and permitting the preservative to diffuse into the wood by osmosis. However, such aqueous pastes dry out quickly, show little adhesion to the wood and are readily washed off the wood when exposed to rain. Therefore, it is a general object of the present invention to provide a composition for preserving moisture-containing wood which will not dry out rapidly, show strong adhesion to the wood surface, and which will be resistant to removal by rain.

It is a specific object of the invention to provide a bi-functional wood preserving composition containing at least one organic water-insoluble preservative and at least one water-soluble preservative, the latter being present in such physical form that it will diffuse slowly into the wood by osmosis but will be substantially resistant to leaching by exposure to rain.

It is also a specific object to provide a simple and efficient method of preserving wood with such bi-functional compositions.

The invention comprises in general, without the use of forced impregnation, a process of preserving wood containing moisture by applying to the debarked surface of the wood a viscous, tacky, non-aqueous composition comprising a water-insoluble organic wood preservative carrying in suspension a water-soluble wood preservative, permitting said water-soluble preservative to diffuse into the wood by osmosis through the medium of the moisture contained in said wood, the water-insoluble organic carrier anchoring the water-soluble inorganic preservative to the surface of the wood and forming a toxic surface coating.

The composition of the present invention contains essentially a water-soluble wood preservative and a water-insoluble organic carrier therefor that is toxic, viscous and tacky. The water-insoluble carrier of the present invention comprises normally solid or semi-solid, organic wood preservatives such as asphalt or mineral pitch, tar or resinous pitch, as well as bitumen and related products, such as coal tar, all of these products being generally designated as "pitch."

The water-soluble wood preservative may be either an organic and/or inorganic preservative agent such as the mycocide salts and insecticides. In general, suitable inorganic salts are those which are soluble in water and comprise materials such as the soluble fluorides of sodium, potassium and ammonium, zinc chloride, copper sulphate, mercuric chloride, as well as soluble arsenates, chromates, bichromates and the like, including chromated zinc chloride and zinc silico-fluoride. In lieu of, or in addition to, the water-soluble inorganic preservative, there may also be employed in the composition organic wood preservatives which are only partially soluble in water as, for instance, dinitrophenol, dinitrocresol, trinitrophenol and the like.

For certain types of application, the carrier may be mixed with diluents or thinners and to this end relatively inert materials such as petroleum distillates or light oils are found suitable although where the preservative composition is to be used for certain treatments, creosotes and light tar fractions in general are excellent diluents.

Fillers that aid in its spreading power upon application and retain the preservative in the carrier may also be added to the composition. The fillers that have been found satisfactory include the colloidal clays, the well known bentonite clays, diatomaceous earth and materials of like physical characteristics. The amount of filler added may comprise any amount consistent with the production of a composition readily applied in use without eliminating the tacky character of the composition and rendering the same friable, granular and noncoherent.

Where the water-insoluble carrier is normally solid, as is the case with some mineral pitches, the carrier is heated to melt the same and the water-soluble wood preservative incorporated in the molten pitch, generally by stirring. Since the water-soluble wood preservatives are in general insoluble in the pitch, the former will exist as solid particles in suspension in the pitch.

The various ingredients of the composition are intimately mixed together and the resultant mixture then applied to a surface of the moist wood to be treated, which wood should be free of bark. If the wood does not contain sufficient moisture, it should first be soaked in or sprayed with water before being treated with the composition. Standing poles, posts, piles and timbers that have been in use and that have absorbed moisture may be treated with the composition of the present invention by applying the same to the wooden member or those portions where preservative action is desired. The composition may also be applied to freshly felled and green timbers prior to their use. The composition may be applied to seasoned timbers and the carrier will hold the water-soluble inorganic preservative in contact with the wood until the wood absorbs moisture from the atmosphere or as a result of rain, after which the water-soluble preservative will diffuse by osmotic pressure.

The application of the composition of the present invention aids in preventing the formation of checks and cracks in logs, timbers and lumber where the same is green or water laden, and, in fact, may be used for the impregnation of all forms of timber which has been drilled or cut when such wood contains moisture.

In the preservation of green timber in accordance with the invention, the green wood is stripped of bark in any convenient fashion in order to expose a wood surface free of bark, the debarked surface is coated with the viscous, tarry material comprising a carrier of pitch and a water-soluble preservative for the wood, and the so-coated wood permitted to stand until the water-soluble preservative has penetrated the wood. The carrier penetrates the surface to a slight degree, but being water-insoluble, the major part remains on the surface forming a relatively hard, dense pitchy coating which excludes insects and prevents entrance of moisture into the wood with attendant rotting and leaching of the water-soluble preservative. The quantity of preservative applied to the wood may vary in accordance with the nature and size of the tree, as well as in accordance with the depth of impregnation desired.

Where it is desired to impregnate the wood only with a mycocide salt, a composition comprising the following ingredients may be employed, this composition being merely illustrative of the invention rather than limitative thereof. One gallon of the material may comprise approximately the following composition:

| | Pounds |
|---|---|
| Semi-fluid pitch | 8 |
| Sodium fluoride | 5 |
| Bentonite clay | 2 |

The completed composition is made by heating the pitch, if the same be solid, to obtain a liquid pitch and then mixing the solid sodium fluoride and bentonite uniformly throughout the molten mass. If the pitch be semi-liquid or liquid, the preservative agents may be directly admixed. After admixture the mass stiffens and sets and may be shipped for use in drums.

Where timbers are to be preserved and treated with a mycocide salt as well as an insecticide, the timbers are treated at the portion to be preserved with a composition per gallon as follows, the water-insoluble carrier being mineral pitch, the insecticide being dinitrophenol and potassium bichromate, the mycocide salt being sodium fluoride:

| | Pounds |
|---|---|
| Solid bitumen | 2½ |
| Creosote oil | 5 |
| Sodium fluoride | 5 |
| Potassium bichromate | 1 |
| Dinitrophenol | ¼ |

The creosote oil and solid bitumen are heated and stirred until the mass contains no lumps of undissolved bitumen. To this mass the solid water-soluble preservatives are added and thoroughly incorporated therein by stirring until a suspension is formed.

As an example of such a compound, the following ingredients may be employed:

| | Pounds |
|---|---|
| Asphalt | 1 |
| Petroleum oil | 6.5 |
| Zinc chloride | 5 |
| Dinitrophenol | ¼ |
| Diatomaceous earth | 3 |

After cutting away the rotted parts of the standing pole, the preservative composition is applied to that portion of the pole subject to ground line action. The asphalt and oil form a substantially water-impervious layer about the pole and upon hardening of the asphalt a coherent coating is formed carrying in it the preservative materials. Where conditions warrant, a waterproof bandage may be wrapped about the coated portion of the pole to insure additional protection to the preservative composition.

Another preservative composition that has been found satisfactory in use upon standing poles is one having per gallon the following ingredients:

| | Pounds |
|---|---|
| Fluid coal tar (viscosity 7-9 Engler) | 6 to 8 |
| Sodium fluoride | 6 to 7 |
| Sodium bichromate | ½ to 1 |
| Dinitrophenol | ¼ to ½ |

For application of the composition to the wood to be preserved, the composition, where solid, is melted and the fluid, molten material applied to the wood surface to be treated as, for instance, by brushing the composition upon the surface or in any other convenient fashion. The application of the preservative composition to the timber may also be effected by dipping the timber into the fluid mixture. By increasing the amount of diluent, the preservative composition may be applied by spraying.

Upon application of the composition of the present invention to wood, the pitch serves to anchor the water-soluble preservative to the surface even when rain beats on the wood. The moisture in the wood permits the diffusion of the water-soluble preservative by osmotic pressure since tests upon treated wood show that the preservative gradually reaches the interior of the wood with excellent penetration in preservative concentration after a few months. The carrier remains substantially on the surface and by reason of its toxicity prevents rotting of the surface layers.

The preservative composition is effective as a preservative in eliminating further decay at the ground line of standing poles, such as telephone poles, power line poles, piling, fence posts and the like, by scraping away the decayed or rotted portions of the standing pole and applying the composition of the present invention comprising a wood preservative and a water immiscible carrier therefor. In treatment of standing poles, it may be advantageous to select mycocides and insecticides that react within the wood to produce difficultly soluble materials having the general structure of a cryolite compound. For example, there may be used a water-soluble inorganic dichromate with a water-soluble fluoride or arsenate.

By the present invention there is provided a novel composition for the preservation of wood whether the same be green wood, felled timber or timber in construction such as standing poles.

The mode of preserving the wood is advantageous in that expensive equipment is not necessary and manual labor has been reduced over processes presently suggested.

As changes may be made in the composition embodied in the present invention without departing from its scope, it is intended that the above composition shall be deemed illustrative and not limitative.

I claim:

1. A process for preserving green or water-laden wood without the use of forced impregnation, comprising applying to the debarked surface of wood containing moisture a viscous, tacky, non-aqueous composition comprising a water-insoluble organic wood preservative as a vehicle carrying in suspension a substantial proportion of solid particles of a stable, water-soluble mycocide preservative which is insoluble in the vehicle, permitting said water-soluble preservative to diffuse into the wood by osmosis through the medium of the moisture contained in the wood, the water-insoluble carrier forming a water-impervious zone at the surface of the treated wood to prevent the leaching out of the water-soluble preservative.

2. A process for preserving green or water-laden wood without the use of forced impregnation, comprising applying to the debarked surface of wood containing moisture a viscous, tacky, non-aqueous composition, comprising a water-insoluble organic wood preservative as a vehicle carrying in suspension a substantial proportion of solid particles of a stable, water-soluble inorganic mycocide preservative which is insoluble in the vehicle, permitting said water-soluble preservative to diffuse into the wood by osmosis through the medium of the moisture contained in the wood, the water-insoluble carrier forming a water-impervious zone at the surface of the treated wood to prevent the leaching out of the water-soluble preservative.

3. A process for preserving green or water-laden wood without the use of forced impregnation, comprising applying to the debarked surface of wood containing moisture a viscous, tacky, non-aqueous composition, comprising a water-insoluble organic wood preservative consisting of normally solid pitch and a liquid organic diluent as a vehicle carrying in suspension a substantial proportion of solid particles of a stable water-soluble mycocide preservative which is insoluble in the vehicle, permitting said water-soluble preservative to diffuse into the wood by osmosis through the medium of the moisture contained in the wood, the water-insoluble carrier forming a water-impervious zone at the surface of the treated wood to prevent the leaching out of the water-soluble preservative.

4. A wood-preserving composition applicable to green or water-laden wood comprising a viscous, tacky, non-aqueous composition, comprising a water-insoluble organic wood preservative as a vehicle carrying in suspension a substantial proportion of solid particles of a stable water-soluble mycocide wood preservative which is insoluble in the vehicle, said water-soluble preservative being adapted to diffuse into moisture-laden wood by osmosis and the water-insoluble carrier being adapted to form a water-impervious zone at the surface of the treated wood to prevent the leaching out of the water-soluble preservative.

5. A wood-preserving composition applicable to green or water-laden wood comprising a viscous, tacky, non-aqueous composition, comprising a water-insoluble organic wood preservative as a vehicle carrying in suspension a substantial proportion of solid particles of a stable water-soluble inorganic mycocide wood preservative which is insoluble in the vehicle, said water-soluble preservative being adapted to diffuse into moisture-laden wood by osmosis and the water-insoluble carrier being adapted to form a water-impervious zone at the surface of the treated wood to prevent the leaching out of the water-soluble preservative.

6. A wood-preserving composition applicable to green or water-laden wood comprising a viscous, tacky, non-aqueous composition, comprising a water-insoluble organic wood preservative consisting of normally solid pitch and a liquid organic diluent as a vehicle carrying in suspension a substantial proportion of solid particles of a stable water-soluble inorganic mycocide wood preservative which is insoluble in the vehicle, said water-soluble preservative being adapted to diffuse into moisture-laden wood by osmosis and the water-insoluble carrier being adapted to form a water-impervious zone at the surface of the treated wood to prevent the leaching out of the water-soluble preservative.

7. A wood-preserving composition applicable to green or water-laden wood comprising a viscous, tacky, non-aqueous composition, comprising pitch and creosote oil as a vehicle and carrying in suspension a substantial proportion of solid particles of a stable water-soluble mycocide wood preservative which is insoluble in the vehicle, said water-soluble preservative being adapted to diffuse into moisture-laden wood by osmosis and the water-insoluble carrier being adapted to form a water-impervious zone at the surface of the treated wood to prevent the leaching out of the water-soluble preservative.

8. A wood-preserving composition applicable to green or water-laden wood comprising a viscous, tacky, non-aqueous composition, comprising coal tar as a vehicle and carrying in suspension a substantial proportion of solid particles of a stable water-soluble mycocide wood preservative which is insoluble in the vehicle, said water-soluble preservative being adapted to diffuse into moisture-laden wood by osmosis and the water-insoluble carrier being adapted to form a water-impervious zone at the surface of the treated wood to prevent the leaching out of the water-soluble preservative.

ENOCH BOSTRUM.